(12) United States Patent
Ford et al.

(10) Patent No.: US 6,766,646 B1
(45) Date of Patent: Jul. 27, 2004

(54) RAPID POWER PRODUCING SYSTEM AND METHOD FOR STEAM TURBINE

(75) Inventors: John Edward Ford, Niskayuna, NY (US); Seyfettin Can Gulen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/715,364

(22) Filed: Nov. 19, 2003

(51) Int. Cl.[7] .............................................. F01K 13/02
(52) U.S. Cl. ......................................... 60/646; 60/657
(58) Field of Search ........................ 60/645, 646, 657, 60/670

(56) References Cited

U.S. PATENT DOCUMENTS

| | | | | |
|---|---|---|---|---|
| 3,898,842 A | * | 8/1975 | Luongo ........................ | 60/653 |
| 3,973,391 A | * | 8/1976 | Reed et al. .................... | 60/794 |
| 4,655,041 A | * | 4/1987 | Del Vecchio et al. ......... | 60/646 |
| 4,707,324 A | * | 11/1987 | Storrick ....................... | 376/215 |
| 6,301,895 B1 | | 10/2001 | Kallina et al. | |
| 6,339,926 B1 | * | 1/2002 | Ichiro et al. ............. | 60/39.182 |
| 6,378,285 B1 | | 4/2002 | Blatter et al. | |
| 2003/0125905 A1 | | 7/2003 | Patanian et al. | |
| 2003/0167774 A1 | | 9/2003 | Bescherer et al. | |

FOREIGN PATENT DOCUMENTS

WO    WO 02/08576 A1    1/2002

\* cited by examiner

*Primary Examiner*—Hoang Nguyen
(74) *Attorney, Agent, or Firm*—Nixon & Vanderhye P.C.

(57) ABSTRACT

A method to rapidly change a power output level of a steam turbine including the steps of: operating the steam turbine at a continuous power output level including regulating a steam temperature to a constant steam temperature set point; receiving a demand for a rapid change in the power output level of the steam turbine; adjusting the steam temperature set point to a temporary temperature excursion limit selected to achieve the demand for the rapid power change; regulating the steam temperature in the turbine to the temporary temperature excursion limit; operating the turbine at a temporary power output level achieved using the temporary excursion limit; generating power by the turbine using steam regulated to the temporary temperature limit, and changing the temperature used to regulate the turbine after a predetermined period.

21 Claims, 2 Drawing Sheets

RAPID POWER PRODUCING SYSTEM AND METHOD FOR STEAM TURBINE

BACKGROUND OF THE INVENTION

This invention relates to steam turbines and to steam and gas turbine combined cycle power generators. In particular, this invention relates to methods to rapidly increase the power output of a steam turbine.

Power generating equipment connected to a power distribution grid is occasionally required to quickly increase power output. Rapid power increases may be needed to balance power in a utility electrical power grid or to manage grid frequency variations. However, it is often difficult for utility steam power generators to immediately increase their power output levels to satisfy demands for quick power.

Power generators, such as steam turbines and combined cycle steam and gas turbine units, are large turbomachines with generation and operation limits. Gas turbines may provide fast additional power. Steam turbines traditionally provide a slower response to power change requests.

To change the power output of a steam turbine, a substantial time period, e.g., 2 to 5 minutes, is generally needed to: increase the fuel to boiler to provide extra heat into the boiler, increase the flow or fluid temperature in the boiler tubes, produce additional steam in the boiler, apply the added steam to the steam turbine, and generate extra power. These steps to increase the power of a steam turbine are used to increase the normal steady-state power output of the turbine. However, there can be a need for a technique to quickly and temporarily increase the power output of a steam turbine.

When a rapid increase in steam turbine power is required, a conventional method involves opening control valves to admit more steam flow to the turbine. This method works if, when the demand for more power is received, the steam control valves are partially closed and pressure in the superheater is substantially higher than that needed to drive the steam turbine at the power level existing immediately prior to the demand. This conventional method is not applicable if the steam turbine is already operating in a steady state condition with the control valves wide open or there is no excess steam pressure in the superheater when the demand for quick power is received. Further, this conventional method increases the flow of steam without increasing the enthalpy amount of steam being generated.

Another conventional method to rapidly (albeit briefly) increase the output of a steam turbine is to spray water in attemperators in the steam superheaters (main or reheat) to generate extra high-pressure steam. Spraying water in the attemperators increases the steam mass flow into the turbine faster than the resulting enthalpy reduction and can relatively quickly increase the power output of the turbine for a limited time. Similarly, and under certain conditions, attemperation by spraying water directly to the hot tubes of the boiler quickly produces additional steam to be fed to the steam generator.

The amount of extra power provided by the attemperation is limited. Moreover, spraying water on the hot tubes of superheater surfaces creates thermal shock that tends to reduce the useful life of these surfaces. Further, attemperation reduces the enthalpy of the steam because steam temperature is reduced when the inner boiler tube surface is cooled by excessive water flow.

BRIEF DESCRIPTION OF THE INVENTION

The invention may be embodied as a method to rapidly change a power output level of a steam turbine comprising: operating the steam turbine at a continuous power output level including regulating a steam temperature to a constant steam temperature set point; receiving a demand for a rapid change in the power output level of the steam turbine; adjusting the steam temperature set point to a temporary temperature excursion limit selected to achieve the demand for the rapid power change; regulating the steam temperature in the turbine to the temporary temperature excursion limit; operating the turbine at a temporary power output level achieved using the temporary excursion limit; generating power by the turbine using steam regulated to the temporary temperature limit, and restoring the temperature used to regulate the turbine after a predetermined period.

The invention may also be embodied as a method to rapidly change a power output level of a steam turbine comprising: operating the steam turbine at a continuous power output level including regulating a steam temperature to a constant steam temperature set point; receiving a demand for a rapid change in the power output level of the steam turbine; adjusting the steam temperature set point to a temporary temperature excursion limit selected to achieve the demand for the rapid power change; regulating the steam temperature in the turbine to the temporary temperature excursion limit; operating the turbine at a temporary power output level achieved using the temporary excursion limit; generating power by the turbine using steam regulated to the temporary temperature limit; changing the temperature used to regulate the turbine after a predetermined period; promptly after receiving the demand for a rapid power change, increasing a fuel flow to a source of heat production applied to a heat recovery and steam generator (HRSG) which provides steam to the steam turbine; increasing an amount of steam provided by the HRSG to the turbine after the fuel flow increase, and continuing an increase in power output by the steam turbine previously achieved by regulating to the temperature excursion limit by applying the increase in the amount of steam provided to the turbine.

The invention may be further embodied as a steam turbine system comprising: a steam turbine having a steam inlet and steam outlet; a steam circuit having a discharge port coupled to the steam inlet of the steam turbine and an inlet port coupled to the steam outlet, and said steam circuit further comprising a steam generation device for generating steam to flow to the steam inlet of the turbine; at least one adjustable valve in said steam circuit, wherein said valve regulates a condition of steam in the circuit in response to a valve actuation control command; a controller receiving control commands and sensor input regarding steam conditions in the circuit, wherein said controller further comprising an electronically stored control program which, in response to a demand for a rapid power change, (i) generates valve actuation control command to adjust the valve in order to elevate a steam temperature in the circuit to a temporary temperature excursion limit, and (ii) maintains the steam temperature at the temporary temperature excursion limit for no longer than a predetermined period.

DETAILED DESCRIPTION OF THE INVENTION

Figure 1:
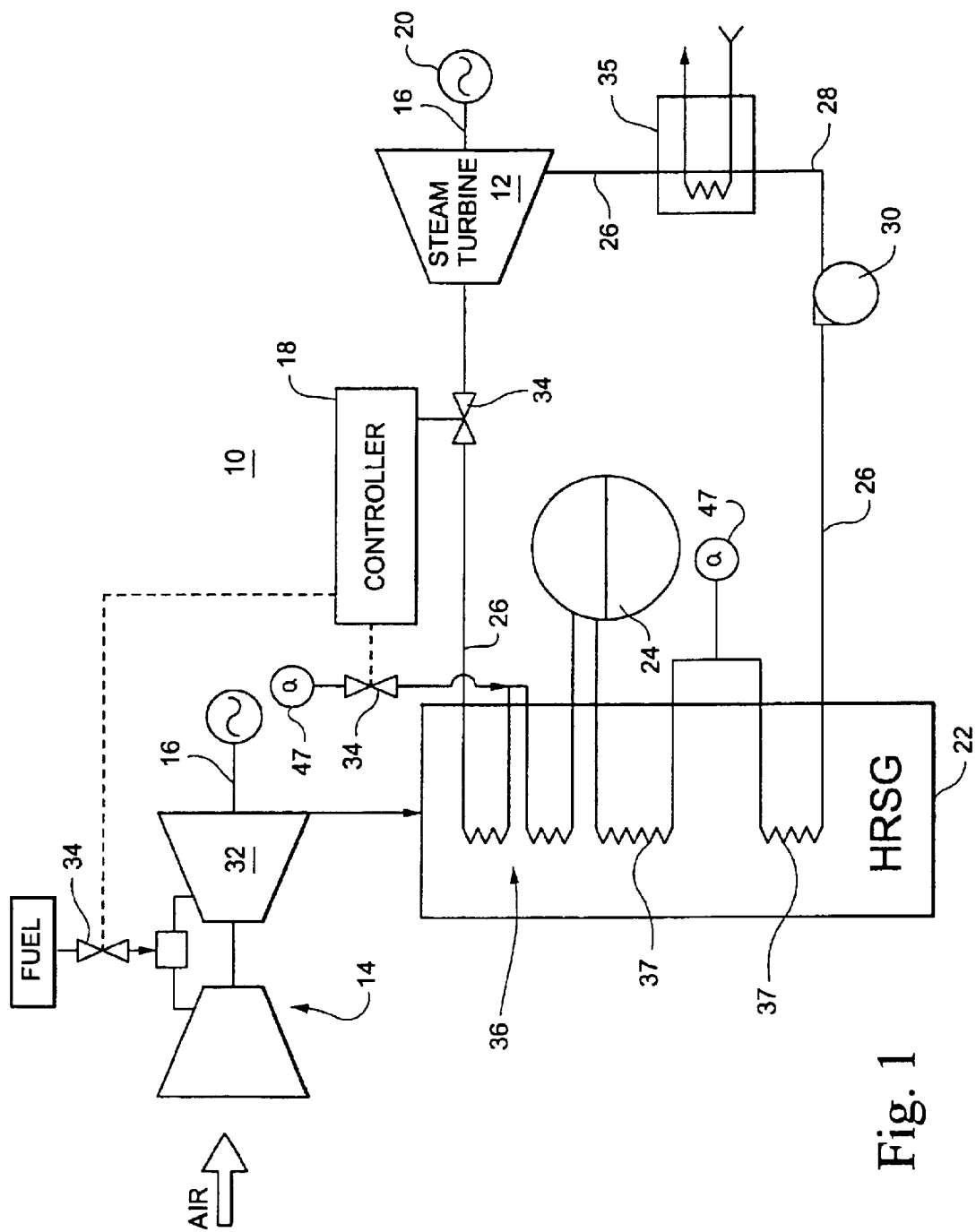
FIG. 1 is a schematic diagram of a combined cycle steam and gas turbine power generation system.

FIG. 1 is a high level schematic diagram of a combined cycle system 10 having a steam turbine 12, a gas turbine 14 and power output shaft(s) 16. A controller 18 operates the steam turbine 12 and gas turbine 14 if necessary based on operator settings regarding the desired power output and based on sensor inputs regarding the current operating conditions and the load 20 being driven by the system. A steam turbine 12, alone or in a gas turbine combined cycle system (GTCC) 10, generally operates at a continuous operating temperature and output power varies with varying steam flow.

A heat recovery and steam generator (HRSG) 22 provides a source of high pressure steam for the steam turbine. The HRSG may or may not include one or more steam drums 24 used to collect steam and condensate from a fluid circuit 26. The circuit 26 includes the steam turbine 12, a heat exchanger (condenser) 35, and a series of tube banks 36, 37 in the HRSG used to heat steam fluid to a superheated steam condition. Condensed steam flows from an output 28 of the steam turbine 12 and heat exchanger 35, and is pumped 30 through tube banks 36, 37 in the HRSG 22, and the drum(s) 24. As the fluid flows through the HRSG, it is converted to superheated steam by heat applied in the HRSG. The source of the heat may be from a burner associated with the HRSG (burner not shown) and/or from hot gases output from the turbine 32 of the gas turbine 14. The superheated steam is applied to drive the steam turbine.

Figure 2:
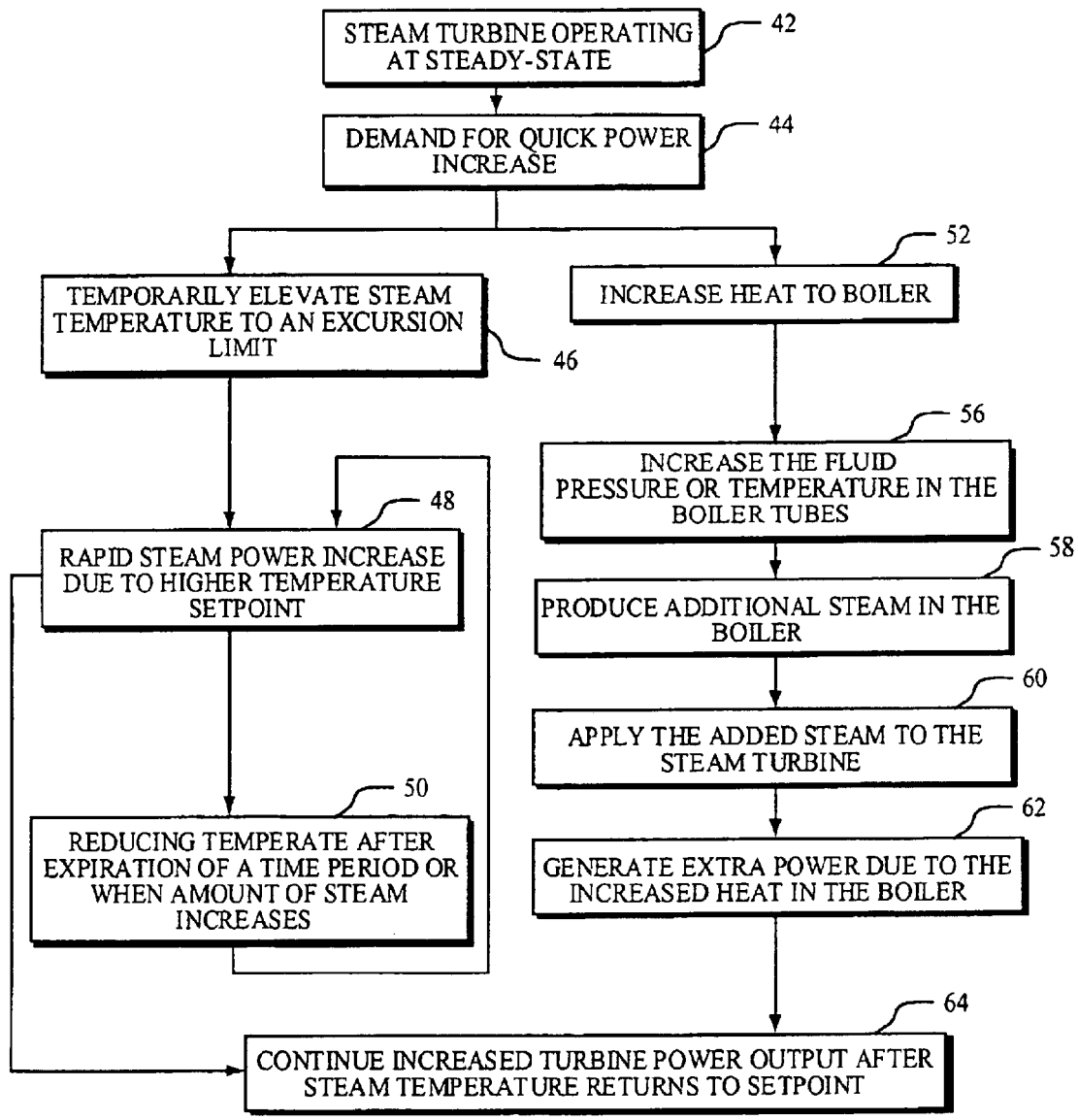
FIG. 2 is a flow chart of steps to rapidly increase the power of a steam turbine.

FIG. 2 is a flow chart of a process to increase the power output of a steam turbine 12. Before the process is initiated, the steam turbine may be operating at a steady state condition 42 at which the inlet steam temperature and output power of the turbine are constant. The controller 18 executes a program to control the settings of valves 34 in this combined cycle example. The controller receives sensor input information from, for example, temperature and pressure sensors at the steam inputs to the turbine and from sensors that monitor the power output of the turbine to the load 20, e.g., an electrical generator. The frequency of the load 20 is sensed continuously and can be used to command the turbine power production. The controller also receives commands and settings for the steam turbine operation, e.g., power output level, from an operator.

The control program includes schedules for the operation of the steam turbine that include operational limits of the turbine. These operational limits include restrictions on steam temperature in the HRSG 22 and the tubes 36 of its superheater. These restrictions are established to ensure, for example, that the operational conditions of the HRSG and turbine do not exceed allowable temperature limits of the steam piping and valves in the steam circuit and steam turbine 12. The standard temperature limits are set for steady state and continuous operation of the turbine and are based on assumptions that the equipment will operate up to these limits for the expected life of the product.

The steam circuit 26 and valves 34 can be operated to temperatures above the continuous temperature limits for short periods of time. Material temperature and time (duration) limits must still be applied. However, the steam temperature limits in the schedules applied by the controller may be expanded for short periods of time, without damaging the steam circuit 26 or turbine 12.

A demand 44 is evaluated by the controller as requiring a quick increase of the power output of the steam turbine 12 (and gas turbine 14) to the load 20. To quickly increase the output power from the steam turbine, the steam temperature is allowed to rapidly increase, step 46, to an excursion limit above the nominal continuous operating temperature for the turbine. The temperature of the steam in the superheater tubes 36 may be quickly elevated by reduction, via valve 34 at 47, of the attemperator water flow ("a") 47. By operating the steam turbine at the elevated excursion limit, the amount of power produced by the turbine is rapidly increased in step 48. The enthalpy of the steam is increased because of the temperature increase. The steam temperature is raised to above the nominal steam temperature used for continuous operation. The steam temperature is regulated to always be within the excursion temperature of the steam pipes and valves at all times.

The excursion temperature operation is permitted for a brief period of time during step 50. After the time expires, the controller again applies the nominal continuous operating temperature limit for the steam temperature. Operation at the excursion limits is permitted repeatedly, provided that there is a required delay after each use of the excursion limit.

During the brief period 50 when the steam turbine is operated at an elevated temperature excursion limit, conventional steps 52, 56, 58, 60 and 62 may be taken to increase the power output of the steam turbine. For example, in conjunction with operating at the elevated set point, the controller may initiate the following steps: increase the heat to boiler to provide extra steam for the turbine (step 52), increase the fluid pressure or temperature in the boiler tubes (step 56), produce additional steam in the boiler (step 58), apply the added steam to the steam turbine (step 60), and generate extra power due to the increase in the boiler (step 62). These steps can be taken while the turbine is operating at an elevated temperature set point.

If an increase of fuel applied to the HRSG, e.g., to the boiler and hot gases from the gas turbine, causes the power output of the steam turbine power to increase to the desired high power level before the expiration of the time period (step 64), then the controller may reduce the steam temperature to a normal temperature setpoint. The increased power output of the turbine due to the temperature excursion may be continued after the steam temperature is reduced because the power output of the turbine has been increased using conventional steps. The combination of using a temporarily elevated temperature set point and a conventional power increase allows the power output of the turbine to be rapidly increased to an high power level that can be continuously maintained by the turbine.

The rapid steam power increase method disclosed herein may be performed alone, or in combination with a gas turbine in a combined cycle system 10. It may be used in combination with existing methods for an additional increase in steam turbine power. The method may be used in power generation systems to meet the requirements for reserve power or primary response when connected to power grids. While the problem has been described as a need to rapidly increase power, there can also be a need to decrease power rapidly. Taking actions opposite to those described for increasing the power rapidly can be used to decrease the power rapidly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to rapidly change a power output level of a steam turbine comprising:
   a. operating the steam turbine at a continuous power output level including regulating a steam temperature to a constant steam temperature set point;
   b. receiving a demand for a rapid change in the power output level of the steam turbine;
   c. adjusting the steam temperature set point to a temporary temperature excursion limit selected to achieve the demand for the rapid power change;
   d. regulating the steam temperature in the turbine to the temporary temperature excursion limit;
   e. operating the turbine at a temporary power output level achieved using the temporary excursion limit;
   f. generating power by the turbine using steam regulated to the temporary temperature limit, and
   g. changing the temperature used to regulate the turbine after a predetermined period.

2. A method as in claim 1 wherein the steam temperature is a temperature at an inlet to the steam turbine.

3. A method as in claim 1 wherein the steam temperature is a temperature in a heat recovery and steam generator which provides steam to the steam turbine.

4. A method as in claim 1 wherein the demand for a rapid change in the power output level is a demand for a rapid increase in the power output level; the temporary temperature excursion limit is elevated above the continuous steam temperature set point, and the temporary power output level is higher than the continuous power output level.

5. A method as in claim 1 wherein the steam temperature is a temperature in a superheater which provides superheated steam to the steam turbine.

6. A method as in claim 1 wherein there is a predetermined period of time setting limits.

7. A method as in claim 1 wherein the change in the temperature in step (g) is to return to the constant steam temperature setpoint.

8. A method as in claim 1 wherein the steam temperature in step (a) is regulated to match the temporary excursion limit in step (d).

9. A method to rapidly change a power output level of a steam turbine comprising:
   a. operating the steam turbine at a continuous power output level including regulating a steam temperature to a constant steam temperature set point;
   b. receiving a demand for a rapid change in the power output level of the steam turbine;
   c. adjusting the steam temperature set point to a temporary temperature excursion limit selected to achieve the demand for the rapid power change;
   d. regulating the steam temperature in the turbine to the temporary temperature excursion limit;
   e. operating the turbine at a temporary power output level achieved using the temporary excursion limit;
   f. generating power by the turbine using steam regulated to the temporary temperature limit;
   g. changing the temperature used to regulate the turbine after a predetermined period;
   h. promptly after receiving the demand for a rapid power change, increasing a fuel flow to a source of heat production applied to a heat recovery and steam generator (HRSG) which provides steam to the steam turbine;
   i. increasing an amount of steam provided by the HRSG to the turbine after the fuel flow increase, and
   j. after step (g), continuing an increase in power output by the steam turbine previously achieved by regulating to the temperature excursion limit by applying the increase in the amount of steam provided to the turbine.

10. A method as in claim 9 wherein the steam temperature is a temperature at an inlet to the steam turbine.

11. A method as in claim 9 wherein the demand for a rapid change in the power output level is a demand for a rapid increase in the power output level; the temporary temperature excursion limit is elevated above the continuous steam temperature set point, and the temporary power output level is higher than the continuous power output level.

12. A method as in claim 9 wherein the steam temperature is a temperature in a superheater which provides superheated steam to the steam turbine.

13. A method as in claim 9 wherein there is a predetermined period of time setting limits.

14. A method as in claim 9 wherein the change in the temperature in step (g) is to return to the constant steam temperature setpoint.

15. A method as in claim 9 wherein the steam temperature in step (a) is regulated to match the temporary excursion limit in step (d).

16. A steam turbine system comprising:
    a steam turbine having a steam inlet and steam outlet;
    a steam circuit having an discharge port coupled to the steam inlet of the steam turbine and an inlet port coupled to the steam outlet, and said steam circuit further comprising a steam generation device for generating steam to flow to the steam inlet of the turbine;
    at least one adjustable steam valve in said steam circuit, wherein said valve regulates a condition of steam in the circuit in response to a steam valve actuation control command;
    a controller receiving control commands and sensor input regarding steam conditions in the circuit, wherein said controller further comprising an electronically stored control program which, in response to a demand for
    a rapid power change, (i) generates the steam valve actuation control command to adjust the steam valve in order to elevate a steam temperature in the circuit to a temporary temperature excursion limit, and (ii) maintains the steam temperature at the temporary temperature excursion limit for no longer than a predetermined period.

17. A steam turbine system as in claim 16 wherein the steam generation device is a heat recovery and steam generator.

18. A steam turbine system as in claim 16 further comprising an attemperator water flow input to the steam circuit and said adjustable steam valve regulates the attemperator water flow into the circuit, wherein said controller in adjusting the steam valve reduces the attemperator water flow into the circuit.

19. A control system for a steam turbine, wherein the steam turbine includes:

a steam inlet and steam outlet, a steam circuit having an discharge port coupled to the steam inlet of the steam turbine and an inlet port coupled to the steam outlet, and said steam circuit further comprising a steam generation device for generating steam to flow to the steam inlet of the turbine, at least one adjustable steam valve in said steam circuit, wherein said valve regulates a condition of steam in the circuit in response to a steam valve actuation control command, and wherein said control system comprises:

a controller receiving control commands and sensor input regarding steam conditions in the circuit, wherein said controller further comprising an electronically stored control program which, in response to a demand for a rapid power change, (i) generates the steam valve actuation control command to adjust the steam valve in order to elevate a steam temperature in the circuit to a temporary temperature excursion limit, and (ii) maintains the steam temperature at the temporary temperature excursion limit for no longer than a predetermined period.

20. A control system as in claim 19 wherein the steam generation device is a heat recovery and steam generator.

21. A control system as in claim 19 further comprising an attemperator water flow input to the steam circuit and said adjustable steam valve regulates the attemperator water flow into the circuit, wherein said controller in adjusting the steam valve reduces the attemperator water flow into the circuit.

* * * * *